(12) United States Patent
Wang et al.

(10) Patent No.: US 12,532,288 B2
(45) Date of Patent: Jan. 20, 2026

(54) POSITIONING METHOD, RELAY DEVICE, INTERNET OF THINGS DEVICE, AND NETWORK DEVICE

(71) Applicant: VIVO MOBILE COMMUNICATION CO., LTD., Dongguan (CN)

(72) Inventors: Yuanyuan Wang, Dongguan (CN); Huaming Wu, Dongguan (CN); Ye Si, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 578 days.

(21) Appl. No.: 18/078,885

(22) Filed: Dec. 9, 2022

(65) Prior Publication Data
US 2023/0109028 A1    Apr. 6, 2023

Related U.S. Application Data

(63) Continuation of application No. PCT/CN2021/099021, filed on Jun. 8, 2021.

(30) Foreign Application Priority Data

Jun. 10, 2020 (CN) .......................... 202010525314.9

(51) Int. Cl.
*H04W 64/00* (2009.01)
(52) U.S. Cl.
CPC .................................. *H04W 64/00* (2013.01)
(58) Field of Classification Search
CPC ......... H04W 4/70; H04W 84/12; H04W 4/80; H04W 4/029; H04W 64/00
See application file for complete search history.

(56) References Cited

U.S. PATENT DOCUMENTS

| 10,431,065 | B2 * | 10/2019 | Brantley | A44C 7/00 |
|---|---|---|---|---|
| 2012/0268239 | A1 * | 10/2012 | Ljung | H04W 12/45 |
| | | | | 340/5.8 |
| 2014/0155059 | A1 * | 6/2014 | Smith | H04W 4/06 |
| | | | | 455/426.1 |
| 2014/0277630 | A1 * | 9/2014 | Meadows | G09B 19/0038 |
| | | | | 700/91 |

(Continued)

FOREIGN PATENT DOCUMENTS

| CN | 104159197 A | 11/2014 |
|---|---|---|
| CN | 105763715 A | 7/2016 |

(Continued)

OTHER PUBLICATIONS

Extended European Search Report issued in related European Application No. 21821525.9, mailed Nov. 2, 2023, 8 pages.

(Continued)

*Primary Examiner* — Dung Hong
(74) *Attorney, Agent, or Firm* — IPX PLLC

(57) ABSTRACT

A positioning method, a relay device, an Internet of Things device, a terminal, and a network device are provided. The positioning method includes: determining a to-be-positioned device in a case that Internet of Things devices are associated, or positioning the to-be-positioned device. The to-be-positioned device includes a first Internet of Things device, and the first Internet of Things device is at least one of the Internet of Things devices associated with a relay device.

18 Claims, 3 Drawing Sheets

Determine a to-be-positioned device in a case that Internet of Things devices are associated, and/or position the to-be-positioned device, where the to-be-positioned device includes a first Internet of Things device, and the first Internet of Things device is at least one of the Internet of Things devices associated with a relay device ∼101

(56) References Cited

U.S. PATENT DOCUMENTS

| | | | | |
|---|---|---|---|---|
| 2015/0156567 A1* | 6/2015 | Oliver | ................ | G08B 21/0227 |
| | | | | 340/870.07 |
| 2016/0350564 A1* | 12/2016 | Nedelcu | ................ | G16H 40/67 |
| 2018/0054796 A1* | 2/2018 | Edge | ................ | H04W 4/02 |
| 2018/0109308 A1 | 4/2018 | Leroux | | |
| 2018/0152809 A1* | 5/2018 | Mei | ................ | G08B 21/00 |
| 2018/0199160 A1* | 7/2018 | Edge | ................ | H04W 4/02 |
| 2020/0169831 A1* | 5/2020 | Li | ................ | G01S 19/43 |
| 2020/0191901 A1* | 6/2020 | Lindoff | ................ | H04B 17/318 |

FOREIGN PATENT DOCUMENTS

| | | | | |
|---|---|---|---|---|
| CN | 106211120 A | | 12/2016 | |
| CN | 106358151 A | * | 1/2017 | .......... H04W 64/006 |
| CN | 109040321 A | | 12/2018 | |
| CN | 109392085 A | | 2/2019 | |
| CN | 110187365 A | | 8/2019 | |
| CN | 110301157 A | | 10/2019 | |
| WO | 2016206177 A1 | | 12/2016 | |

OTHER PUBLICATIONS

International Search Report issued in corresponding International Application No. PCT/CN2021/099021, mailed Jun. 9, 2021, 4 pages.
Huawei et al, "Discussion of sidelink positioning", 3GPP TSG RAN WG1 #101-e R1-2004609, Jun. 5, 2020.
First Office Action issued in related Chinese Application No. 202010525314.9, mailed Apr. 21, 2022, 12 pages.
Second Office Action issued in related Chinese Application No. 202010525314.9, mailed Dec. 8, 2022, 10 pages.

* cited by examiner

Determine a to-be-positioned device in a case that Internet of Things devices are associated, and/or position the to-be-positioned device, where the to-be-positioned device includes a first Internet of Things device, and the first Internet of Things device is at least one of the Internet of Things devices associated with a relay device ~101

FIG. 1

Transmit or receive a location-related message with an associated relay device, where the location-related message includes at least one of location information, a capability interaction message, or a positioning assistance message; and the location-related message corresponds to at least one of the Internet of Things device or the relay device ~201

FIG. 2

Determine a to-be-positioned device, where the to-be-positioned device includes at least one of Internet of Things devices associated with a relay device ~301

FIG. 3

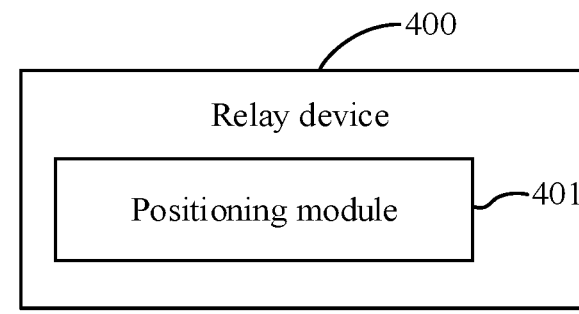

FIG. 4

POSITIONING METHOD, RELAY DEVICE, INTERNET OF THINGS DEVICE, AND NETWORK DEVICE

CROSS-REFERENCE TO RELATED APPLICATIONS

This application is a continuation of International Application No. PCT/CN2021/099021, filed on Jun. 8, 2021, which claims the priority of Chinese Patent Application No. 202010525314.9 filed on Jun. 10, 2020. The entire contents of each of the above-referenced applications are expressly incorporated herein by reference.

TECHNICAL FIELD

This application relates to the field of communications, and in particular, to a positioning method, a relay device, an Internet of Things device, and a network device.

BACKGROUND

At present, Internet of Things devices such as wearable devices and smart home devices, such as smart headsets, smart watches, and smart lighting devices, are widely used in people's production and life. The above Internet of Things devices are positioned by often using a data plane or privatization process, and data is often transmitted by means of Bluetooth, WIFI, and other manners. How to determine location information of an Internet of Things device in a better, more accurate, and more secure manner, and integrate with mobile communication standards (a Long Term Evolution (LTE) system and a New Radio (NR) system) and current positioning standardization protocols (an LTE Positioning Protocol (LPP)), an NR Positioning Protocol (NRPP)), and the like) is a technical problem that needs to be solved urgently.

SUMMARY

Objectives of embodiments of this application are to provide a positioning method, a relay device, an Internet of Things device, and a network device.

According to a first aspect, an embodiment of this application provides a positioning method, applied to a relay device, the method including:

determining a to-be-positioned device in a case that Internet of Things devices are associated, and/or positioning the to-be-positioned device, where the to-be-positioned device includes a first Internet of Things device, and the first Internet of Things device is at least one of the Internet of Things devices associated with the relay device.

According to a second aspect, an embodiment of this application provides a relay device, including:

a positioning module, configured to determine a to-be-positioned device in a case that Internet of Things devices are associated, and/or position the to-be-positioned device, where the to-be-positioned device includes a first Internet of Things device, and the first Internet of Things device is at least one of the Internet of Things devices associated with the relay device.

According to a third aspect, an embodiment of this application provides a terminal device, including: a processor, a memory, and a program or instruction stored in the memory and executable on the processor, the program or instruction, when executed by the processor, implementing steps of the method according to the first aspect.

According to a fourth aspect, an embodiment of this application provides a readable storage medium, storing a program or instruction, the program or instruction, when executed by the processor, implementing steps of the method according to the first aspect.

According to a fifth aspect, an embodiment of this application provides a positioning method, applied to an Internet of Things device, the method including:

transmitting or receiving a location-related message with an associated relay device, where the location-related message includes at least one of location information, a capability interaction message, or a positioning assistance message; and the location-related message corresponds to at least one of the Internet of Things device or the relay device.

According to a sixth aspect, an embodiment of this application provides an Internet of Things device, including:

an interaction module, configured to transmit or receive a location-related message with an associated relay device, where the location-related message includes at least one of location information, a capability interaction message, or a positioning assistance message; and the location-related message corresponds to at least one of the Internet of Things device or the relay device.

According to a seventh aspect, an embodiment of this application provides a terminal device, including: a processor, a memory, and a program or instruction stored in the memory and executable on the processor, the program or instruction, when executed by the processor, implementing steps of the method according to the fifth aspect.

According to an eighth aspect, an embodiment of this application provides a readable storage medium, storing a program or instruction, the program or instruction, when executed by a processor, implementing steps of the method according to the fifth aspect.

According to a ninth aspect, an embodiment of this application provides a positioning method, applied to a network device, the method including:

determining a to-be-positioned device, where the to-be-positioned device includes at least one of Internet of Things devices associated with a relay device.

According to a tenth aspect, an embodiment of this application provides a network device, including:

a determining module, configured to determine a to-be-positioned device, where the to-be-positioned device includes at least one of Internet of Things devices associated with a relay device.

According to an eleventh aspect, an embodiment of this application provides a network device, including: a processor, a memory, and a program or instruction stored in the memory and executable on the processor, the program or instruction, when executed by the processor, implementing steps of the method according to the ninth aspect.

According to a twelfth aspect, an embodiment of this application provides a readable storage medium, storing a program or instruction, the program or instruction, when executed by a processor, implementing steps of the method according to the ninth aspect.

In the embodiments of this application, in a scenario in which a relay device is associated with one or more Internet of Things devices, by the relay device, a to-be-positioned device that needs to be positioned may be determined and/or accurate positioning of the to-be-positioned device may be realized, where the to-be-positioned device may include, but is not limited to, a first Internet of Things device associated with the relay device, the first Internet of Things device may include at least one of the Internet of Things devices associated with the relay device, the Internet of Things devices associated with the relay device may at least include: an Internet of Things device that the relay device has ever been associated with or an Internet of Things device that the relay device is being associated with, and device types may be the same or different. In this way, through the embodiments of this application, the positioning of the Internet of Things devices can be at least realized through a mobile communication network, and is more accurate and more secure.

BRIEF DESCRIPTION OF THE DRAWINGS

The accompanying drawings described herein are used for providing a further understanding of this application, and form part of this application. Exemplary embodiments of this application and descriptions thereof are used for explaining this application, and do not constitute any inappropriate limitation to this application. In the accompanying drawings:

FIG. 1 is a schematic flowchart of a positioning method according to an embodiment of this application;

FIG. 2 is a schematic flowchart of a second positioning method according to an embodiment of this application;

FIG. 3 is a schematic flowchart of a third positioning method according to an embodiment of this application;

FIG. 4 is a schematic structural diagram of a relay device according to an embodiment of this application;

DETAILED DESCRIPTION

Figure 5:
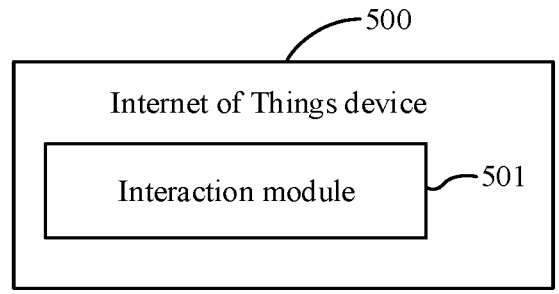
FIG. 5 is a schematic structural diagram of an Internet of Things device according to an embodiment of this application.

The following describes the technical solutions in the embodiments of this application with reference to the accompanying drawings in the embodiments of this application. Apparently, the described embodiments are some embodiments of this application rather than all of the embodiments. All other embodiments obtained by a person of ordinary skill in the art based on the embodiments of this application without creative efforts shall fall within the protection scope of this application.

The specification and claims of this application, and terms "first" and "second" are used to distinguish similar objects, but are unnecessarily used to describe a specific sequence or order. It should be understood that the data in such a way are interchangeable in proper circumstances, so that the embodiments of this application can be implemented in other orders than the order illustrated or described herein. In addition, in the specification and the claims, "and/or" means at least one of the connected objects, and the character "I" generally indicates an "or" relationship between the associated objects.

The technical solutions of this application may be applied to various communication systems, such as: a Global System of Mobile Communication (GSM), a Code Division Multiple Access (CDMA) system, Wideband Code Division Multiple Access (WCDMA), a General Packet Radio Service (GPRS), and LTE/LTE Advanced (LTE-A), and NR.

A user equipment (UE), also referred to as a terminal device, a mobile user equipment or the like, may communicate with one or more core networks through a Radio Access Network (RAN) or the like. The user equipment may be a terminal device such as a mobile phone (also referred to as a "cellular" phone) and a computer with a terminal device. For example, the user equipment may be a portable, pocket-sized, handheld, computer built-in, or in-vehicle mobile apparatus, which exchanges languages and/or data with the radio access network.

A network device, also referred to as a base station, may be a Base Transceiver Station (BTS) in GSM or CDMA, or may be a NodeB in WCDMA, or may be an evolved NodeB (eNB or e-NodeB) in LTE, or may be a next-generation NodeB (gNB) in a future 5G network.

The technical solutions provided in the embodiments of this application are described in detail below with reference to the accompanying drawings.

Referring to FIG. 1, an embodiment of this application provides a positioning method, performed by a relay device. The relay device may include, but is not limited to, a mobile phone device, a computer device, a home hub device (a central management or node device), an Internet of Things device, a smart device, a smart robot, or the like. The method includes the following procedures and steps.

Step 101: Determine a to-be-positioned device in a case that Internet of Things devices are associated, and/or position the to-be-positioned device, where the to-be-positioned device includes a first Internet of Things device, and the first Internet of Things device is at least one of the Internet of Things devices associated with the relay device.

In this embodiment of this application, in a scenario in which a relay device is associated with one or more Internet of Things devices, such as a scenario of a Personal Internet of Things (PIoTs), by the relay device, a to-be-positioned device that needs to be positioned may be determined and/or accurate positioning of the to-be-positioned device may be realized, where the to-be-positioned device may include, but is not limited to, a first Internet of Things device associated with the relay device, the first Internet of Things device may include at least one of the Internet of Things devices associated with the relay device, the Internet of Things devices associated with the relay device may at least include: an Internet of Things device that the relay device has ever been associated with or an Internet of Things device that the relay device is being associated with, and device types may be the same or different. In this way, the positioning of the Internet of Things devices can be at least realized through a mobile communication network, and is more accurate and more secure.

The Internet of Things devices associated with the relay device may include, but are not limited to, smart watches, smart glasses, smart bracelets, home smart devices, smart robotic arms in factories, robots, and the like.

It should be noted that, the positioning method in this embodiment of this application may include at least the following three solutions:

Solution 1: Determine a to-be-positioned device in a case that Internet of Things devices are associated, where the to-be-positioned device includes a first Internet of Things device, and the first Internet of Things device is at least one of the Internet of Things devices associated with the relay device. It may be understood that, through this solution, in a scenario in which the relay device is associated with the Internet of Things devices, the screening and determination of the to-be-positioned device can be at least realized by the relay device. Further, for example, the positioning of the to-be-positioned device can be realized by the relay device or another device.

Solution 2: Determine a to-be-positioned device in a case that Internet of Things devices are associated, and position the to-be-positioned device, where the to-be-positioned device includes a first Internet of Things device, and the first Internet of Things device is at least one of the Internet of Things devices associated with the relay device. It may be understood that, through this solution, in a scenario in which the relay device is associated with the Internet of Things devices, the screening and determination of the to-be-positioned device can be at least realized by the relay device first, and the positioning of the to-be-positioned device is further realized by the relay device.

Solution 3: Position a to-be-positioned device in a case that Internet of Things devices are associated, where the to-be-positioned device includes a first Internet of Things device, and the first Internet of Things device is at least one of the Internet of Things devices associated with the relay device. It may be understood that, through this solution, in a scenario in which the relay device is associated with the Internet of Things devices, the positioning of the Internet of Things devices associated with the relay device can be at least realized by the relay device.

For example, in the positioning method in this embodiment of this application, the above to-be-positioned device may also include the relay device.

For example, the first Internet of Things device is in one of the following states: a connected state, an idle state, or an inactive state.

In an example, the first Internet of Things device and a network device keep the connected state; and in another example, the first Internet of Things device and the relay device keep the connected state. In other examples, the first Internet of Things device may also be in the idle state or the inactive state, and is activated to enter the connected state when needing to communicate with the network device or the relay device.

For example, in the positioning method in this embodiment of this application, step 101 may be implemented through different specific implementations, and includes, but is not limited to, the following specific embodiments:

Specific Embodiment 1

In the specific embodiment 1, step 101 may be performed as the following content: determining the to-be-positioned device and/or positioning the to-be-positioned device according to a service request.

It may be understood that, the relay device may determine the to-be-positioned device and/or position the to-be-positioned device according to a specific service request of the first Internet of Things device or the relay device or a location server or a location management device or the like. That is, the operation of determining the to-be-positioned device and/or positioning the to-be-positioned device may be triggered by another device other than the relay device, or may be initiated by the relay device.

In an example, when a game server or a game Application (App) requests location information of Virtual Reality (VR) glasses, the relay device (such as a mobile phone) determines the to-be-positioned device, namely, the VR glasses, according to the service request, and starts to position the VR glasses.

In another example, when a location of a Bluetooth headset needs to be found, the relay device determines the to-be-positioned device as the Bluetooth headset according to the requirement, and positions the Bluetooth headset.

Specific Embodiment 2

In the specific embodiment 2, step 101 may be performed as the following content: determining the to-be-positioned device and/or positioning the to-be-positioned device according to a positioning assistance message.

For example, the positioning method in this embodiment of this application may further include one of the following content:

sending a first request to a network device, where the first request is used for obtaining the positioning assistance message; or receiving the positioning assistance message sent by a network device, where the positioning assistance message is used for determining the to-be-positioned device and/or positioning the to-be-positioned device.

It may be understood that, the relay device may determine the to-be-positioned device and/or position the to-be-positioned device according to the positioning assistance message provided by the network device, where the positioning assistance message may be actively issued by the network device, or may be obtained by the relay device based on a request.

For example, the first request includes at least one of the following:

(i) Identification information of the to-be-positioned device, such as a type of the to-be-positioned device, an Identifier (ID), and device indication information. The device indication information may include a unique identification ID of the first Internet of Things device associated with the relay device, and a corresponding manner between the relay device and the Internet of Things device may be stipulated by a protocol or pre-configured or explicitly configured.

(ii) First request information for positioning the to-be-positioned device. For example, the first request information includes at least one of the following: a used positioning method; or a type or content of the required positioning assistance message.

For example, the positioning assistance message includes at least one of the following:

(a) Identification information of the to-be-positioned device, such as a type of the to-be-positioned device, an ID, and device indication information. The device indication information may include a unique identification ID of the first Internet of Things device associated with the relay device, and a corresponding manner between the relay device and the Internet of Things device may be stipulated by a protocol or pre-configured or explicitly configured.

(b) First information for positioning the to-be-positioned device. In some embodiments, the first information includes at least one of the following:

information of a reference signal measured by the first Internet of Things device; information of a reference signal sent by the first Internet of Things device; information required by the first Internet of Things device to perform Global Navigation Satellite System (GNSS) related positioning; information required by the first Internet of Things device to perform sensor positioning; a positioning method in which the relay device positions the first Internet of Things device, for example, a time-based positioning method (such as, an Observed Time Difference Of Arrival (OTDOA), a Downlink Time Difference Of Arrival (DL-TDOA), an Uplink Time Difference Of Arrival (UL-TDOA), or a Round-Trip Time (RTT)), GNSS positioning, sensor positioning, angle-based positioning (such as, an Angle of Departure (AOD) or an Angle of Arrival (AOA)), Bluetooth positioning, or Wireless Fidelity (WIFI) positioning; information of a reference signal sent by the relay device to the first Internet of Things device; information of a reference signal received by the relay device from the first Internet of Things device; information requested by the relay device from the first Internet of Things device; or location information and time information of the network device.

For example, the positioning assistance message includes first indication information, and the first indication information is used for indicating one of the following:

whether to send the positioning assistance message to the to-be-positioned device; or an association relationship between the positioning assistance message and the to-be-positioned device.

It may be understood that, when the positioning assistance message known by the Internet of Things device is required, the first indication information instructs the relay device to send the above information to the Internet of Things device. For example, when the to-be-positioned device includes the first Internet of Things device and requires the first Internet of Things device to perform part of a positioning process, and the part of the process needs the positioning assistance message, the first indication information instructs to send information that the first Internet of Things device needs to know. Further, for example, when the to-be-positioned device includes the first Internet of Things device and the first Internet of Things device needs to perform DL-TDOA or OTDOA or RTT positioning, the relay device sends related information of a Transmit/Receive Point (TRP) that needs to be measured by the first Internet of Things device (for example, configuration information of a Positioning Reference Signal (PRS) (such as, a time domain (a period), a frequency domain, space, and other information, and configuration information of resources and resourcesets of the PRS and other reference signals), location information of the TRP, and time information of the TRP) and/or information of a reference signal that needs to be sent by the first Internet of Things device (such as configuration information of a Sounding Reference Signal (SRS)) to the Internet of Things device.

The above reference signals in this embodiment of this application include, but are not limited to: the PRS, the SRS, a Cell Reference Signal (CRS), a Synchronization Signal and PBCH block (SSB), a Tracking Reference Signal (TRS), a Channel State Information Reference Signal (CSI-RS), and a Random Access Channel (RACH) signal.

For example, when the to-be-positioned device includes the first Internet of Things device and requires the first Internet of Things device to perform positioning relative to the relay device, the relay device sends the information of the reference signal that needs to be measured by the first Internet of Things device or the information of the reference signal that needs to be transmitted by the first Internet of Things device to the first Internet of Things device.

For example, when the to-be-positioned device includes the first Internet of Things device and requires the first Internet of Things device to perform positioning relative to a reference location, the relay device sends a positioning assistance message of a motion sensor to the first Internet of Things device.

In some embodiments, when some of positioning assistance messages are to be sent to the relay device and some are to be sent to the first Internet of Things device, the first indication information is used to distinguish which ones need to be processed by the relay device and which ones need to be processed by the first Internet of Things device, and information that needs to be processed by the first Internet of Things device is forwarded to the first Internet of Things device.

In some embodiments, when the to-be-positioned device includes the relay device and the first Internet of Things device and positioning assistance data also includes positioning assistance information used by the relay device to determine location information, this part of the information only needs to be processed by the relay device, and positioning assistance information that needs to be used by the first Internet of Things device to determine the location needs to be indicated by the first indication information.

In some embodiments, when the to-be-positioned device includes the relay device and the first Internet of Things device and positioning assistance data includes positioning assistance information used by the first Internet of Things device to determine location information of the relay device and the first Internet of Things device, the positioning assistance information includes information for the first Internet of Things device to position the relay device. The information may include the following parts: information of a reference signal that needs to be sent by the relay device; information of a reference signal that needs to be received by the relay device; information of a reference signal measured by the Internet of Things device; information of a reference signal sent by the Internet of Things device; information required by the Internet of Things device to perform global navigation satellite system GNSS related positioning; and information required by the Internet of Things device to perform sensor positioning.

Specific Embodiment 3

In the specific embodiment 3, step 101 may be performed as the following content: determining the to-be-positioned device and/or positioning the to-be-positioned device according to a location request information.

For example, the positioning method in this embodiment of this application may further include one of the following content:

(1) receiving location request information corresponding to the to-be-positioned device, where the location request information may be received from the network device, a client, the first Internet of Things device, and the like; and (2) sending the location request information corresponding to the to-be-positioned device, that is, the relay device may also actively initiate a location request for the to-be-positioned device.

the location request information is used for determining the to-be-positioned device and/or positioning the to-be-positioned device position, and the location request information includes at least one of the following:

a type of the to-be-positioned device; a location request type of the to-be-positioned device; or identification information of the to-be-positioned device.

For example, in other embodiments of the positioning method in this embodiment of this application, the step of positioning the to-be-positioned device in step 101 may be performed as the following content: receiving location information sent by the to-be-positioned device.

It may be understood that, when the to-be-positioned device is positioned, the relay device may realize the positioning of the to-be-positioned device, the to-be-positioned device may also report the location information obtained through positioning, and the to-be-positioned device may also be jointly positioned by the relay device and the to-be-positioned device. For example, the location information may be obtained by the to-be-positioned device to position based on the received positioning assistance message, and may also be obtained by directly positioning without using the additional positioning assistance message.

In an embodiment, the determining the location information by the relay device according to the positioning assistance message includes an absolute location and a relative location of the to-be-positioned device relative to the relay device.

In another embodiment, the determining the location information by the to-be-positioned device includes the absolute location and the relative location of the to-be-positioned device relative to the relay device, and further includes sending to the relay device.

In another embodiment, the absolute location is determined by the relay device, and the relative location is determined by the to-be-positioned device.

That is, in the positioning method in this embodiment of this application, the location information includes, but is not limited to, one of the following:

(1) Location measurement information or location information of the to-be-positioned device. The location measurement information of the to-be-positioned device may include information obtained by the to-be-positioned device based on a signal measurement result, and the location information of the to-be-positioned device may indicate absolute location information of the to-be-positioned device.

(2) Relative location information of the to-be-positioned device. For example, the relative location information may indicate relative location information relative to the relay device.

For example, the positioning method in this embodiment of this application may further include at least one of the following content: reporting location information obtained by positioning the to-be-positioned device; or reporting identification information of the to-be-positioned device.

For example, the positioning method in this embodiment of this application may further include the following content:

receiving a capability interaction message from a first device or sending the capability interaction message to the first device, where the first device includes at least one of a network device or the first Internet of Things device.

It may be understood that, through capability interaction with the first device in advance, a favorable guarantee is provided for subsequent realization of the positioning of the to-be-positioned device and the reporting of the location information.

For example, in the positioning method in this embodiment of this application, the capability interaction message sent to the network device includes at least one of the following:

(1) Identification information of the relay device, such as a type of the relay device, an ID, and device indication information. The device indication information may include a unique identification ID of the first Internet of Things device associated with the relay device, and a corresponding manner between the relay device and the Internet of Things device may be stipulated by a protocol or pre-configured or explicitly configured.

(2) Capability information of the relay device. For example, the capability information of the relay device includes at least one of the following:

whether the relay device supports establishing an association with the first Internet of Things device; whether the relay device supports positioning the first Internet of Things device; whether the relay device supports reporting location information of the first Internet of Things device; whether the relay device supports transmitting a positioning assistance message corresponding to the first Internet of Things device; whether the relay device supports capability interaction with the first Internet of Things device; a positioning method supported by the first Internet of Things device, for example, a time-based positioning method (such as, an OTDOA, a DL-TDOA, a UL-TDOA, or an RTT), GNSS positioning, sensor positioning, angle-based positioning (such as, an AOD or an AOA), or Bluetooth positioning; whether the relay device supports being positioned by the Internet of Things device; or whether the relay device supports measuring a reference signal sent by the Internet of Things device.

(3) Identification information of the first Internet of Things device, such as a type of the relay device, an ID, and device indication information.

(4) Capability information of the first Internet of Things device. In some embodiments, the capability information of the first Internet of Things device includes at least one of the following:

whether the first Internet of Things device supports capability interaction with the relay device; whether the first Internet of Things device supports positioning assistance message and location information interaction with the relay device; a positioning method supported by the first Internet of Things device, for example, a time-based positioning method (such as, an OTDOA, a DL-TDOA, a UL-TDOA, or an RTT), GNSS positioning, sensor positioning, angle-based positioning (such as, an AOD or an AOA), or Bluetooth positioning; a positioning manner supported by the first Internet of Things device; a reporting manner supported by the first Internet of Things device; a measurement capability supported by the first Internet of Things device, for example, supported measurement signal types, whether to support simultaneous measurement of a plurality of signals, or numbers such as frequency layers, a number of TRPs, a number of resources, and a number of resourcesets; a reporting capability supported by the first Internet of Things device, for example, supported reporting measurement result types, whether to support simultaneous reporting of a plurality of signals, or numbers such as frequency layers, a number of TRPs, a number of resources, and a number of resourcesets; a power control capability supported by the first Internet of Things device, such as, open loop, closed loop, and a reference path loss signal; a space relativity capability supported by the first Internet of Things device, such as, a space related signal and a Quasi Co-Location (QCL) signal; or a signal processing capability supported by the first Internet of Things device, such as a number of signals processed in a specific time.

Further, before the sending the capability interaction message to the network device, the method may further include: receiving content of a message request sent by the network device, to send the capability interaction message to the network device based on the message request.

For example, in the positioning method in this embodiment of this application, the capability interaction message received from the first Internet of Things device or sent to the first Internet of Things device includes at least one of the following: identification information of the first Internet of Things device; or capability information of the first Internet of Things device.

For example, the capability information of the first Internet of Things device includes at least one of the following: whether the first Internet of Things device supports capability interaction with the relay device; whether the first Internet of Things device supports positioning assistance message and location information interaction with the relay device; a positioning method supported by the first Internet of Things device, for example, a time-based positioning method (such as, an OTDOA, a DL-TDOA, a UL-TDOA, or an RTT), GNSS positioning, sensor positioning, angle-based positioning (such as, an AOD or an AOA), or Bluetooth positioning; a positioning manner supported by the first Internet of Things device; a reporting manner supported by the first Internet of Things device; a measurement capability supported by the first Internet of Things device, for example, supported measurement signal types, whether to support simultaneous measurement of a plurality of signals, or numbers such as frequency layers, a number of TRPs, a number of resources, and a number of resourcesets; a reporting capability supported by the first Internet of Things device, for example, supported reporting measurement result types, whether to support simultaneous reporting of a plurality of signals, or numbers such as frequency layers, a number of TRPs, a number of resources, and a number of resourcesets; a power control capability supported by the first Internet of Things device, such as, open loop, closed loop, and a reference path loss signal; a space relativity capability supported by the first Internet of Things device, such as, a space related signal and a QCL signal; or a signal processing capability supported by the first Internet of Things device, such as a number of signals processed in a specific time.

Further, before the receiving a capability interaction message from the first Internet of Things device or sending the capability interaction message to the first Internet of Things device, interaction of a message request may also be performed with the first Internet of Things device, to receive or send the capability interaction message based on the corresponding message request.

Referring to FIG. 2, an embodiment of this application provides a positioning method, performed by an Internet of Things device. The method includes the following procedures and steps.

Step 201: Transmit or receive a location-related message with an associated relay device, where the location-related message includes at least one of location information, a capability interaction message, or a positioning assistance message; and the location-related message corresponds to at least one of the Internet of Things device or the relay device.

In this embodiment of this application, an Internet of Things device may perform transmission or receiving of a location-related message with an associated relay device, where the relay device may be associated with one or more Internet of Things devices, and the Internet of Things devices associated with the relay device may at least include: an Internet of Things device that the relay device has ever been associated with or an Internet of Things device that the relay device is being associated with, and device types may be the same or different. Further, the location-related message for interaction and corresponding to at least one of the relay device or the Internet of Things device includes, but is not limited to, at least one of location information, a capability interaction message, or a positioning assistance message. In this way, the positioning of the Internet of Things devices can be at least realized through a mobile communication network, and is more accurate and more secure.

For example, the positioning method in this embodiment of this application may further include the following content:

reporting the location information to a network device. That is, on a basis of realization of sending the location information to the relay device, the Internet of Things device may further directly report the location information thereof to the network device especially when the Internet of Things device can directly establish a communication connection with the network device.

For example, the positioning method in this embodiment of this application may further include at least one of the following content:

(1) sending identification information of the relay device to a network device, to report the relay device associated with the Internet of Things device, so that the network device can learn that the Internet of Things device can report the location information by a specific relay device; or (2) sending a second request to the network device, where the second request is used for obtaining the positioning assistance message. The second request may be used for instructing to obtain the positioning assistance message by the relay device or directly obtaining the positioning assistance message.

For example, the second request may at least include: (1) identification information of at least one of the Internet of Things device and the relay device that are associated with each other, such as a device type, an ID, and device indication information; or (2) second request information for positioning at least one of the Internet of Things device and the relay device that are associated with each other. For example, the second request information includes at least one of the following: a used positioning method; or a type or content of the required positioning assistance message.

For example, the Internet of Things device is in an idle state, an inactive state, or a connected state.

Further, for example, in the positioning method in this embodiment of this application, in addition to being obtained from a process of information interaction with the relay device, the positioning assistance message may also be obtained in a special obtaining manner, such as the positioning assistance message is obtained from broadcast information. In this case, the Internet of Things device is in a non-connected state.

For example, in the positioning method in this embodiment of this application, in a case that the location-related message includes the positioning assistance message, the positioning assistance message includes at least one of the following:

(1) Identification information of the relay device, such as a type of the relay device, an ID, and device indication information. It may be understood that, based on the identification information of the relay device, it can be at least specified that the location information is reported to a specific relay device or the relay device. The device indication information may include a unique identification ID of the relay device associated with the Internet of Things device, and a corresponding manner between the relay device and the Internet of Things device may be stipulated by a protocol or pre-configured or explicitly configured.

(2) Identification information of the Internet of Things device, such as a type of the Internet of Things device, an ID, and device indication information. It may be understood that, based on the identification information of the Internet of Things device, it can be at least specified that the network device intends to realize the positioning of a specific Internet of Things device. The device indication information may include a unique identification ID of the Internet of Things device associated with the relay device, and a corresponding manner between the relay device and the Internet of Things device may be stipulated by a protocol or pre-configured or explicitly configured.

(3) Second information for positioning the Internet of Things device. For example, the second information includes at least one of the following:

information of a reference signal measured by the Internet of Things device; information of a reference signal sent by the Internet of Things device; information required by the Internet of Things device to perform global navigation satellite system GNSS related positioning; information required by the Internet of Things device to perform sensor positioning; a positioning method in which the relay device positions the Internet of Things device and assistance data thereof, for example, a time-based positioning method (such as, an OTDOA, a DL-TDOA, a UL-TDOA, or an RTT), GNSS positioning, sensor positioning, angle-based positioning (such as, an AOD or an AOA), Bluetooth positioning, or WIFI positioning; information of a reference signal sent by the relay device to the Internet of Things device; information of a reference signal received by the relay device from the Internet of Things device; information requested by the relay device from the Internet of Things device; or location information and time information of the network device.

(4) Third information for positioning the relay device. The third information may include part of the content of the above second information, for example, including: information of a reference signal measured by the Internet of Things device; information of a reference signal sent by the Internet of Things device; information required by the Internet of Things device to perform global navigation satellite system GNSS related positioning; and information required by the Internet of Things device to perform sensor positioning. It should be noted that, the signals measured and sent herein may be different from those in the second information. For example, the second information may include a reference signal sent by a measurement base station or a TRP or another network device, and the third information may include the reference signal sent by the relay device.

It should be noted that, in the positioning method in this embodiment of this application, in addition to the above manner of positioning according to the received positioning assistance message, manners in which the Internet of Things device obtains the location information that needs to be reported through positioning further at least include a manner of positioning without additional assistance information, such as, Motion Sensor Positioning (IMU), WIFI positioning, or Bluetooth positioning.

For example, in the positioning method in this embodiment of this application, the location information includes, but is not limited to, one of the following:

(1) Location measurement information or location information of the Internet of Things device. The location measurement information of the Internet of Things device may include information obtained by the Internet of Things device based on a signal measurement result, and the location information of the Internet of Things device may indicate absolute location information of the Internet of Things device.

(2) Relative location information of the Internet of Things device. For example, the relative location information may indicate relative location information relative to the relay device.

(3) Location measurement information or location information of the relay device.

(4) Relative location information of the relay device.

For example, in the positioning method in this embodiment of this application, the capability interaction message includes at least one of the following:

(1) Identification information of the relay device, such as a type of the relay device, an ID, and device indication information. The device indication information may include a unique identification ID of the relay device associated with the Internet of Things device, and a corresponding manner between the relay device and the Internet of Things device may be stipulated by a protocol or pre-configured or explicitly configured.

(2) Capability information of the relay device. For example, the capability information of the relay device includes at least one of the following:

whether the relay device supports establishing an association with the Internet of Things device; whether the relay device supports positioning the Internet of Things device; whether the relay device supports being positioned by the Internet of Things device; whether the relay device supports measuring a reference signal sent by the Internet of Things device; whether the relay device supports reporting location information of the Internet of Things device; whether the relay device supports transmitting a positioning assistance message corresponding to the Internet of Things device; or whether the relay device supports capability interaction with the Internet of Things device.

(3) Identification information of the Internet of Things device, such as a type of the Internet of Things device, an ID, and device indication information. The device indication information may include a unique identification ID of the Internet of Things device associated with the relay device, and a corresponding manner between the relay device and the Internet of Things device may be stipulated by a protocol or pre-configured or explicitly configured.

(4) Capability information of the Internet of Things device. In some embodiments, the capability information of the Internet of Things device includes at least one of the following:

whether the Internet of Things device supports capability interaction with the relay device; whether the Internet of Things device supports positioning assistance message and location information interaction with the relay device; a positioning method supported by the Internet of Things device, for example, a time-based positioning method (such as, an OTDOA, a DL-TDOA, a UL-TDOA, or an RTT), GNSS positioning, sensor positioning, angle-based positioning (such as, an AOD or an AOA), Bluetooth positioning, or WIFI positioning; a positioning manner supported by the first Internet of Things device; a reporting manner supported by the first Internet of Things device; a measurement capability supported by the first Internet of Things device, for example, supported measurement signal types, whether to support simultaneous measurement of a plurality of signals, or numbers such as frequency layers, a number of TRPs, a number of resources, and a number of resourcesets; a reporting capability supported by the first Internet of Things device, for example, supported reporting measurement result types, whether to support simultaneous reporting of a plurality of signals, or numbers such as frequency layers, a number of TRPs, a number of resources, and a number of resourcesets; a power control capability supported by the first Internet of Things device, such as, open loop, closed loop, and a reference path loss signal; a space relativity capability supported by the first Internet of Things device, such as, a space related signal and a QCL signal; or a signal processing capability supported by the first Internet of Things device, such as a number of signals processed in a specific time.

Further, for example, before transmitting or receiving the capability interaction message with the associated relay device, interaction of a message request may also be performed with the relay device, to receive or send the capability interaction message based on the corresponding message request.

Further, for example, the positioning method in this embodiment of this application may further include the content: receiving a message request sent by the network device, and sending the corresponding capability interaction message to the network device based on the message request.

Referring to FIG. 3, an embodiment of this application provides a positioning method, performed by a network device. The network device may include a Location Management Function (LMF). The method includes the following procedures and steps.

Step 301: Determine a to-be-positioned device, where the to-be-positioned device includes at least one of Internet of Things devices associated with a relay device.

In this embodiment of this application, in a scenario in which a relay device is associated with one or more Internet of Things devices, a to-be-positioned device that needs to be positioned may be determined by a network device, where the to-be-positioned device may include, but is not limited to, at least one of the Internet of Things devices associated with the relay device, the Internet of Things devices associated with the relay device may at least include: an Internet of Things device that the relay device has ever been associated with or an Internet of Things device that the relay device is being associated with, and device types may be the same or different. In this way, the positioning of the Internet of Things devices can be at least realized through a mobile communication network, and is more accurate and more secure.

For example, the positioning method in this embodiment of this application may further include the following content:

receiving a capability interaction message sent by the to-be-positioned device, where the capability interaction message includes at least one of the following:

(1) Identification information of the to-be-positioned device, such as a type of the to-be-positioned device, an ID, and device indication information. The device indication information may include a unique identification ID of the to-be-positioned device (such as at least one of the relay device and the Internet of Things device that are associated with each other), and a corresponding manner between the relay device and the Internet of Things device may be stipulated by a protocol or pre-configured or explicitly configured.

(2) Capability information of the to-be-positioned device.

Through capability interaction with the to-be-positioned device in advance, a favorable guarantee is provided for subsequent realization of the positioning of the to-be-positioned device.

For example, in a case that the to-be-positioned device includes the relay device, the capability information of the to-be-positioned device includes at least one of the following:

whether the relay device supports establishing an association with the Internet of Things device; whether the relay device supports positioning the Internet of Things device; whether the relay device supports reporting location information of the Internet of Things device; whether the relay device supports transmitting a positioning assistance message corresponding to the Internet of Things device; whether the relay device supports capability interaction with the Internet of Things device; whether the relay device supports being positioned by the Internet of Things device; whether the relay device supports measuring a reference signal sent by the Internet of Things device; whether the Internet of Things device supports capability interaction with the relay device; whether the Internet of Things device supports positioning assistance message and location information interaction with the relay device; a positioning method supported by the Internet of Things device, for example, a time-based positioning method (such as, an OTDOA, a DL-TDOA, a UL-TDOA, or an RTT), GNSS positioning, sensor positioning, angle-based positioning (such as, an AOD or an AOA), Bluetooth positioning, or WIFI positioning; a positioning manner supported by the first Internet of Things device; a reporting manner supported by the first Internet of Things device; a measurement capability supported by the first Internet of Things device, for example, supported measurement signal types, whether to support simultaneous measurement of a plurality of signals, or numbers such as frequency layers, a number of TRPs, a Fnumber of resources, and a number of resourcesets; a reporting capability supported by the first Internet of Things device, for example, supported reporting measurement result types, whether to support simultaneous reporting of a plurality of signals, or numbers such as frequency layers, a number of TRPs, a number of resources, and a number of resourcesets; a power control capability supported by the first Internet of Things device, such as, open loop, closed loop, and a reference path loss signal; a space relativity capability supported by the first Internet of Things device, such as, a space related signal and a QCL signal; or a signal processing capability supported by the first Internet of Things device, such as a number of signals processed in a specific time.

For example, in a case that the to-be-positioned device includes the Internet of Things device, the capability information of the to-be-positioned device includes at least one of the following:

whether the Internet of Things device supports capability interaction with the relay device; whether the Internet of Things device supports positioning assistance message and location information interaction with the relay device; a positioning method supported by the Internet of Things device, for example, a time-based positioning method (such as, an OTDOA, a DL-TDOA, a UL-TDOA, or an RTT), GNSS positioning, sensor positioning, angle-based positioning (such as, an AOD or an AOA), or Bluetooth positioning;

a positioning manner supported by the first Internet of Things device; a reporting manner supported by the first Internet of Things device; a measurement capability supported by the first Internet of Things device, for example, supported measurement signal types, whether to support simultaneous measurement of a plurality of signals, or numbers such as frequency layers, a number of TRPs, a number of resources, and a number of resourcesets; a reporting capability supported by the first Internet of Things device, for example, supported reporting measurement result types, whether to support simultaneous reporting of a plurality of signals, or numbers such as frequency layers, a number of TRPs, a number of resources, and a number of resourcesets; a power control capability supported by the first Internet of Things device, such as, open loop, closed loop, and a reference path loss signal; a space relativity capability supported by the first Internet of Things device, such as, a space related signal and a QCL signal; or a signal processing capability supported by the first Internet of Things device, such as a number of signals processed in a specific time.

Further, for example, before the receiving the capability interaction message sent by the to-be-positioned device, the method may further include the following content: sending a message request to the to-be-positioned device, to obtain the capability interaction message.

For example, the positioning method in this embodiment of this application may further include the following content:

sending a positioning assistance message to the to-be-positioned device, where the positioning assistance message is used for positioning the to-be-positioned device. In this way, the efficiency of positioning the to-be-positioned device can be improved.

The positioning assistance message includes at least one of the following:
(1) Identification information of the to-be-positioned device, such as a type of the to-be-positioned device, an ID, and device indication information. The device indication information may include a unique identification ID of the to-be-positioned device (such as at least one of the relay device and the Internet of Things device that are associated with each other), and a corresponding manner between the relay device and the Internet of Things device may be stipulated by a protocol or pre-configured or explicitly configured.
(2) Fourth information for positioning the to-be-positioned device. For example, the fourth information includes at least one of the following:
information of a reference signal measured by the Internet of Things device; information of a reference signal sent by the Internet of Things device; information required by the Internet of Things device to perform global navigation satellite system GNSS related positioning; information required by the Internet of Things device to perform sensor positioning; a positioning method in which the relay device positions the Internet of Things device; information of a reference signal sent by the relay device to the Internet of Things device; information of a reference signal received by the relay device from the Internet of Things device; information requested by the relay device from the Internet of Things device; or location information and time information of the network device.

For example, the positioning assistance message includes first indication information, and the first indication information is used for indicating one of the following: whether the relay device sends the positioning assistance message to the Internet of Things device; or an association relationship between the positioning assistance message and the to-be-positioned device.

Further, for example, the positioning assistance message may be fed back according to a specific request of the to-be-positioned device, that is, the step of sending a positioning assistance message to the to-be-positioned device may be performed as the following content:

sending the positioning assistance message corresponding to a third request to the to-be-positioned device, where the third request is sent by the to-be-positioned device.

In some embodiments, the third request includes at least one of the following:
(1) Identification information of the to-be-positioned device, such as a type of the to-be-positioned device, an ID, and device indication information. The device indication information may include a unique identification ID of the first Internet of Things device associated with the relay device, and a corresponding manner between the relay device and the Internet of Things device may be stipulated by a protocol or pre-configured or explicitly configured.
(2) Third request information for positioning the to-be-positioned device. In some embodiments, the third request information includes at least one of the following: a used positioning method; or a type or content of the required positioning assistance message.

For example, the positioning method in this embodiment of this application may further include at least one of the following content:
(1) receiving location information sent by the to-be-positioned device, where the location information may be obtained by the to-be-positioned device to position based on the received positioning assistance message, and may also be obtained by directly positioning without using the additional positioning assistance message; or
(2) receiving identification information of the to-be-positioned device.

For example, in the positioning method in this embodiment of this application, the location information includes, but is not limited to, one of the following:
(1) Location measurement information or location information of the Internet of Things device. The location measurement information of the Internet of Things device may include information obtained by the Internet of Things device based on a signal measurement result, and the location information of the Internet of Things device may indicate absolute location information of the Internet of Things device.
(2) Relative location information of the Internet of Things device. In some embodiments, the relative location information may indicate relative location information relative to the relay device.
(3) Location measurement information or location information of the relay device.
(4) Relative location information of the relay device.

For example, before step 301, the positioning method in this embodiment of this application may further include one of the following content:
(1) receiving location request information corresponding to the to-be-positioned device, such as receiving a request from a Location Server (LCS); or
(2) sending the location request information corresponding to the to-be-positioned device, that is, the network device may also actively initiate obtaining of the location information of the to-be-positioned device.

The location request information is used for determining the to-be-positioned device, and the location request information includes at least one of the following:

a type of the to-be-positioned device; a location request type of the to-be-positioned device; or identification information of the to-be-positioned device, such as an ID of the to-be-positioned device.

Referring to FIG. 4, an embodiment of this application provides a relay device 400, where the relay device 400 includes:

a positioning module 401, configured to determine a to-be-positioned device in a case that Internet of Things devices are associated, and/or position the to-be-positioned device, where the to-be-positioned device includes a first Internet of Things device, and the first Internet of Things device is at least one of the Internet of Things devices associated with the relay device.

For example, in the relay device 400 in this embodiment of this application, the positioning module 401 may be configured to perform one of the following operations:

determining the to-be-positioned device and/or positioning the to-be-positioned device according to a service request; determining the to-be-positioned device and/or positioning the to-be-positioned device according to a positioning assistance message; or determining the to-be-positioned device and/or positioning the to-be-positioned device according to location request information.

For example, the relay device 400 in this embodiment of this application may further include a transmission module, and the transmission module may be configured to perform at least one of the following operations:

sending a first request to a network device, where the first request is used for obtaining the positioning assistance message; or receiving the positioning assistance message sent by a network device, where the positioning assistance message is used for determining the to-be-positioned device and/or positioning the to-be-positioned device.

For example, in the relay device 400 in this embodiment of this application, the positioning assistance message includes at least one of the following:

identification information of the to-be-positioned device; or first information for positioning the to-be-positioned device.

For example, in the relay device 400 in this embodiment of this application, the first information includes at least one of the following:

information of a reference signal measured by the first Internet of Things device; information of a reference signal sent by the first Internet of Things device; information required by the first Internet of Things device to perform global navigation satellite system GNSS related positioning; information required by the first Internet of Things device to perform sensor positioning; a positioning method in which the relay device positions the first Internet of Things device; information of a reference signal sent by the relay device to the first Internet of Things device; information of a reference signal received by the relay device from the first Internet of Things device; information requested by the relay device from the first Internet of Things device; or location information and time information of the network device.

For example, in the relay device 400 in this embodiment of this application, the positioning assistance message includes first indication information, and the first indication information is used for indicating at least one of the following:

whether to send the positioning assistance message to the to-be-positioned device; or an association relationship between the positioning assistance message and the to-be-positioned device.

For example, in the relay device 400 in this embodiment of this application, the positioning module 401 may be configured to:

receive location information sent by the to-be-positioned device.

For example, the relay device 400 in this embodiment of this application further includes a reporting module, and the reporting module may be configured to perform at least one of the following operations:

reporting location information obtained by positioning the to-be-positioned device; or reporting identification information of the to-be-positioned device.

For example, in the relay device 400 in this embodiment of this application, the location information includes one of the following:

location measurement information or location information of the to-be-positioned device; or relative location information of the to-be-positioned device.

For example, in the relay device 400 in this embodiment of this application, the transmission module may be further configured to: receive a capability interaction message from a first device or send the capability interaction message to the first device, where the first device includes at least one of a network device or the first Internet of Things device.

For example, in the relay device 400 in this embodiment of this application, the capability interaction message sent to the network device includes at least one of the following:

identification information of the relay device; capability information of the relay device; identification information of the first Internet of Things device; or capability information of the first Internet of Things device.

For example, in the relay device 400 in this embodiment of this application, the capability information of the relay device includes at least one of the following:

whether the relay device supports establishing an association with the first Internet of Things device; whether the relay device supports positioning the first Internet of Things device; whether the relay device supports reporting location information of the first Internet of Things device; whether the relay device supports transmitting a positioning assistance message corresponding to the first Internet of Things device; whether the relay device supports capability interaction with the first Internet of Things device; whether the relay device supports being positioned by the Internet of Things device; or whether the relay device supports measuring a reference signal sent by the Internet of Things device.

For example, in the relay device 400 in this embodiment of this application, the capability interaction message received from the first Internet of Things device or sent to the first Internet of Things device includes at least one of the following:

identification information of the first Internet of Things device; or capability information of the first Internet of Things device.

For example, in the relay device 400 in this embodiment of this application, the capability information of the first Internet of Things device includes at least one of the following: whether the first Internet of Things device supports capability interaction with the relay device; whether the first Internet of Things device supports positioning assistance message and location information interaction with the relay device; a positioning method supported by the first Internet of Things device; a positioning manner supported by the first Internet of Things device; a reporting manner supported by the first Internet of Things device; a measurement capability supported by the Internet of Things device; a reporting capability supported by the Internet of Things device; a power control capability supported by the Internet of Things device; a space relativity capability supported by the Internet of Things device; or a signal processing capability supported by the Internet of Things device.

For example, in the relay device 400 in this embodiment of this application, the transmission module may be configured to perform one of the following operations:

receiving location request information corresponding to the to-be-positioned device; or sending the location request information corresponding to the to-be-positioned device, where the location request information is used for determining the to-be-positioned device and/or positioning the to-be-positioned device position, and the location request information includes at least one of the following: a type of the to-be-positioned device; a location request type of the to-be-positioned device; or identification information of the to-be-positioned device.

For example, in the relay device 400 in this embodiment of this application, the first Internet of Things device is in one of the following states: a connected state, an idle state, or an inactive state.

It can be understood that, the relay device 400 in this embodiment of this application can realize the foregoing positioning method performed by the relay device 400. Descriptions related to the foregoing positioning method are applicable to the relay device 400, and details are not described herein again.

In this embodiment of this application, in a scenario in which a relay device is associated with one or more Internet of Things devices, by the relay device, a to-be-positioned device that needs to be positioned may be determined and/or accurate positioning of the to-be-positioned device may be realized, where the to-be-positioned device may include, but is not limited to, a first Internet of Things device associated with the relay device, the first Internet of Things device may include at least one of the Internet of Things devices associated with the relay device, the Internet of Things devices associated with the relay device may at least include: an Internet of Things device that the relay device has ever been associated with or an Internet of Things device that the relay device is being associated with, and device types may be the same or different. In this way, through this embodiment of this application, the positioning of the Internet of Things devices can be at least realized through a mobile communication network, and is more accurate and more secure.

Referring to FIG. 5, an embodiment of this application provides an Internet of Things device 500, where the Internet of Things device 500 includes:

an interaction module 501, configured to transmit or receive a location-related message with an associated relay device, where the location-related message includes at least one of location information, a capability interaction message, or a positioning assistance message; and the location-related message corresponds to at least one of the Internet of Things device or the relay device.

For example, the Internet of Things device 500 in this embodiment of this application may further include: a sending module, and the sending module may be configured to perform at least one of the following operations:

sending identification information of the relay device to a network device; or sending a second request to the network device, where the second request is used for obtaining the positioning assistance message.

For example, in the Internet of Things device 500 in this embodiment of this application, the Internet of Things device is in an idle state, an inactive state, or a connected state.

For example, in the Internet of Things device 500 in this embodiment of this application, the positioning assistance message includes at least one of the following:
identification information of the relay device; identification information of the Internet of Things device; second information for positioning the Internet of Things device; or third information for positioning the relay device.

For example, in the Internet of Things device 500 in this embodiment of this application, the second information includes at least one of the following:
information of a reference signal measured by the Internet of Things device; information of a reference signal sent by the Internet of Things device; information required by the Internet of Things device to perform global navigation satellite system GNSS related positioning; information required by the Internet of Things device to perform sensor positioning; a positioning method in which the relay device positions the Internet of Things device; information of a reference signal sent by the relay device to the Internet of Things device; information of a reference signal received by the relay device from the Internet of Things device; information requested by the relay device from the Internet of Things device; or location information and time information of the network device.

For example, in the Internet of Things device 500 in this embodiment of this application, the capability interaction message includes at least one of the following:
identification information of the relay device; capability information of the relay device; identification information of the Internet of Things device; or capability information of the Internet of Things device.

For example, in the Internet of Things device 500 in this embodiment of this application, the capability information of the relay device includes at least one of the following:
whether the relay device supports establishing an association with the Internet of Things device; whether the relay device supports positioning the Internet of Things device; whether the relay device supports being positioned by the Internet of Things device; whether the relay device supports measuring a reference signal sent by the Internet of Things device; whether the relay device supports reporting location information of the Internet of Things device; whether the relay device supports transmitting a positioning assistance message corresponding to the Internet of Things device; or whether the relay device supports capability interaction with the Internet of Things device.

For example, in the Internet of Things device 500 in this embodiment of this application, the capability information of the Internet of Things device includes at least one of the following:
whether the Internet of Things device supports capability interaction with the relay device; whether the Internet of Things device supports positioning assistance message and location information interaction with the relay device; a positioning method supported by the Internet of Things device; a positioning manner supported by the Internet of Things device; a reporting manner supported by the Internet of Things device; a measurement capability supported by the Internet of Things device; a reporting capability supported by the Internet of Things device; a power control capability supported by the Internet of Things device; a space relativity capability supported by the Internet of Things device; or a signal processing capability supported by the Internet of Things device.

For example, in the Internet of Things device 500 in this embodiment of this application, the sending module 501 may be further configured to: report the location information to a network device.

For example, in the Internet of Things device 500 in this embodiment of this application, in a case that the location-related message includes the location information, the location information includes one of the following: location measurement information or location information of the Internet of Things device; relative location information of the Internet of Things device; location measurement information or location information of the relay device; or relative location information of the relay device.

It can be understood that, the Internet of Things device 500 in this embodiment of this application can realize the foregoing positioning method performed by the Internet of Things device 500. Descriptions related to the foregoing positioning method are applicable to the Internet of Things device 500, and details are not described herein again.

In this embodiment of this application, an Internet of Things device may perform transmission or receiving of a location-related message with an associated relay device, where the relay device may be associated with one or more Internet of Things devices, and the Internet of Things devices associated with the relay device may at least include: an Internet of Things device that the relay device has ever been associated with or an Internet of Things device that the relay device is being associated with, and device types may be the same or different. Further, the location-related message for interaction and corresponding to at least one of the relay device or the Internet of Things device includes, but is not limited to, at least one of location information, a capability interaction message, or a positioning assistance message. In this way, the positioning of the Internet of Things devices can be at least realized through a mobile communication network, and is more accurate and more secure.

Figure 6:
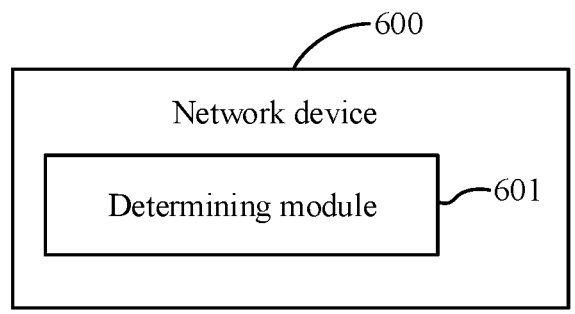
FIG. 6 is a schematic structural diagram of a network device according to an embodiment of this application.

Referring to FIG. 6, an embodiment of this application provides a network device 600, where the network device 600 includes:

a determining module 601, configured to determine a to-be-positioned device, where the to-be-positioned device includes at least one of Internet of Things devices associated with a relay device.

For example, the network device 600 in this embodiment of this application may further include: a receiving module, configured to receive a capability interaction message sent by the to-be-positioned device, where the capability interaction message includes at least one of the following: identification information of the to-be-positioned device; or capability information of the to-be-positioned device.

For example, in the network device 600 in this embodiment of this application, in a case that the to-be-positioned device includes the relay device, the capability information of the to-be-positioned device includes at least one of the following:

whether the relay device supports establishing an association with the Internet of Things device; whether the relay device supports positioning the Internet of Things device; whether the relay device supports reporting location information of the Internet of Things device; whether the relay device supports transmitting a positioning assistance message corresponding to the Internet of Things device; whether the relay device supports capability interaction with the Internet of Things device; whether the relay device supports being positioned by the Internet of Things device; whether the relay device supports measuring a reference signal sent by the Internet of Things device; whether the Internet of Things device supports capability interaction with the relay device; whether the Internet of Things device supports positioning assistance message and location information interaction with the relay device; a positioning method supported by the Internet of Things device; a positioning manner supported by the Internet of Things device; a reporting manner supported by the Internet of Things device; a measurement capability supported by the Internet of Things device; a reporting capability supported by the Internet of Things device; a power control capability supported by the Internet of Things device; a space relativity capability supported by the Internet of Things device; or a signal processing capability supported by the Internet of Things device.

For example, in the network device 600 in this embodiment of this application, in a case that the to-be-positioned device includes the Internet of Things device, the capability information of the to-be-positioned device includes at least one of the following:

whether the Internet of Things device supports capability interaction with the relay device; whether the Internet of Things device supports positioning assistance message and location information interaction with the relay device; a positioning method supported by the Internet of Things device; a positioning manner supported by the Internet of Things device; a reporting manner supported by the Internet of Things device; a measurement capability supported by the Internet of Things device; a reporting capability supported by the Internet of Things device; a power control capability supported by the Internet of Things device; a space relativity capability supported by the Internet of Things device; or a signal processing capability supported by the Internet of Things device.

For example, the network device 600 in this embodiment of this application may further include: a sending module, configured to send a positioning assistance message to the to-be-positioned device, where the positioning assistance message is used for positioning the to-be-positioned device; and the positioning assistance message includes at least one of the following: identification information of the to-be-positioned device; or fourth information for positioning the to-be-positioned device.

For example, in the network device 600 in this embodiment of this application, the fourth information includes at least one of the following:

information of a reference signal measured by the Internet of Things device; information of a reference signal sent by the Internet of Things device; information required by the Internet of Things device to perform global navigation satellite system GNSS related positioning; information required by the Internet of Things device to perform sensor positioning; a positioning method in which the relay device positions the Internet of Things device; information of a reference signal sent by the relay device to the Internet of Things device; information of a reference signal received by the relay device from the Internet of Things device; information requested by the relay device from the Internet of Things device; or location information and time information of the network device.

For example, in the network device 600 in this embodiment of this application, the positioning assistance message includes first indication information, and the first indication information is used for indicating one of the following:

whether the relay device sends the positioning assistance message to the Internet of Things device; or an association relationship between the positioning assistance message and the to-be-positioned device.

For example, in the network device 600 in this embodiment of this application, the sending module may be configured to:

send the positioning assistance message corresponding to a third request to the to-be-positioned device, where the third request is sent by the to-be-positioned device.

For example, in the network device 600 in this embodiment of this application, the receiving module may be further configured to perform at least one of the following operations:

receiving location information sent by the to-be-positioned device; or receiving identification information of the to-be-positioned device.

For example, in the network device 600 in this embodiment of this application, the location information includes one of the following:

location measurement information or location information of the Internet of Things device; relative location information of the Internet of Things device; location measurement information or location information of the relay device; or relative location information of the relay device.

For example, the network device 600 in this embodiment of this application may further include: a transmission module, configured to perform, before the determining a to-be-positioned device, at least one of the following operations:

receiving location request information corresponding to the to-be-positioned device; or sending the location request information corresponding to the to-be-positioned device, where the location request information is used for determining the to-be-positioned device, and the location request information includes at least one of the following: a type of the to-be-positioned device; a location request type of the to-be-positioned device; or identification information of the to-be-positioned device.

It can be understood that, the network device 600 in this embodiment of this application can realize the foregoing positioning method performed by the network device 600. Descriptions related to the foregoing positioning method are applicable to the network device 600, and details are not described herein again.

In this embodiment of this application, in a scenario in which a relay device is associated with one or more Internet of Things devices, a to-be-positioned device that needs to be positioned may be determined by a network device, where the to-be-positioned device may include, but is not limited to, at least one of the Internet of Things devices associated with the relay device, the Internet of Things devices associated with the relay device may at least include: an Internet of Things device that the relay device has ever been associated with or an Internet of Things device that the relay device is being associated with, and device types may be the same or different. In this way, the positioning of the Internet of Things devices can be at least realized through a mobile communication network, and is more accurate and more secure.

Figure 7:
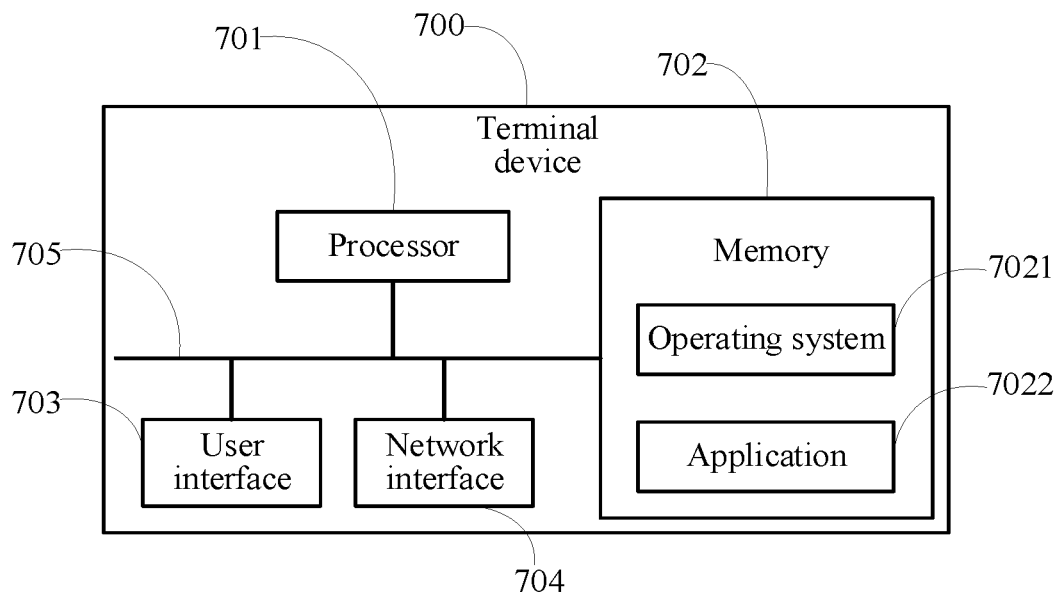
FIG. 7 is a schematic structural diagram of a terminal device according to an embodiment of this application.

FIG. 7 is a block diagram of a terminal device according to another embodiment of this application. A terminal device 700 shown in FIG. 7 includes at least one processor 701, a memory 702, at least one network interface 704, and a user interface 703. All the components in the terminal device 700 are coupled together by a bus system 705. It may be understood that, the bus system 705 is configured to implement connection and communication between the components. In addition to a data bus, the bus system 705 further includes a power bus, a control bus, and a state signal bus. However, for ease of clear description, all types of buses in FIG. 7 are marked as the bus system 705.

The user interface 703 may include a display, a keyboard, or a click/tap device (such as a mouse, a track ball, a touch panel, or a touchscreen).

It may be understood that, the memory 702 in the embodiments of this application may be a volatile memory or a non-volatile memory, or may include both a volatile memory and a non-volatile memory. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM) serving as an external cache. Through example but not limitative description, many forms of RAMs may be used, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). The memory 702 in the system and method described in the embodiments of this application is intended to include, but is not limited to, the memories and any other memory of a suitable type.

In some implementations, the memory 702 stores the following element, executable module, or data structure, or a subset thereof, or an extension set thereof: an operating system 7021 and an application 7022.

The operating system 7021 includes various system programs, such as framework layers, kernel library layers, and driver layers used for implementing various basic business and processing hardware-based tasks. The application 7022 may include various applications, for example, a media player and a browser, used for implementing various application services. A program for implementing the method in the embodiments of this application may be included in the application program 7022.

In this embodiment of this application, the terminal device 700 further includes: a program or instruction stored in the memory 702 and executable on the processor 701.

For example, the program or instruction, when executed by the processor 701, implements the following step:

determining a to-be-positioned device in a case that Internet of Things devices are associated, and/or positioning the to-be-positioned device, where the to-be-positioned device includes a first Internet of Things device, and the first Internet of Things device is at least one of the Internet of Things devices associated with the relay device.

In this embodiment of this application, in a scenario in which a relay device is associated with one or more Internet of Things devices, by the relay device, a to-be-positioned device that needs to be positioned may be determined and/or accurate positioning of the to-be-positioned device may be realized, where the to-be-positioned device may include, but is not limited to, a first Internet of Things device associated with the relay device, the first Internet of Things device may include at least one of the Internet of Things devices associated with the relay device, the Internet of Things devices associated with the relay device may at least include: an Internet of Things device that the relay device has ever been associated with or an Internet of Things device that the relay device is being associated with, and device types may be the same or different. In this way, the positioning of the Internet of Things devices can be at least realized through a mobile communication network, and is more accurate and more secure.

For example, the program or instruction, when executed by the processor 701, may further implement the following step:

transmitting or receiving a location-related message with an associated relay device, where the location-related message includes at least one of location information, a capability interaction message, or a positioning assistance message; and the location-related message corresponds to at least one of the Internet of Things device or the relay device.

In this embodiment of this application, an Internet of Things device may perform transmission or receiving of a location-related message with an associated relay device, where the relay device may be associated with one or more Internet of Things devices, and the Internet of Things devices associated with the relay device may at least include: an Internet of Things device that the relay device has ever been associated with or an Internet of Things device that the relay device is being associated with, and device types may be the same or different. Further, the location-related message for interaction and corresponding to at least one of the relay device or the Internet of Things device includes, but is not limited to, at least one of location information, a capability interaction message, or a positioning assistance message. In this way, the positioning of the Internet of Things devices can be at least realized through a mobile communication network, and is more accurate and more secure.

The method disclosed in the embodiments of this application may be applied to the processor 701 or implemented by the processor 701. The processor 701 may be an integrated circuit chip, having a capability of processing a signal. In an implementation process, steps in the foregoing methods can be implemented by using a hardware integrated logical circuit in the processor 701, or by using instructions in a form of software. The foregoing processor 701 may be a general purpose processor, a Digital Signal Processor (DSP), an Application Specific Integrated Circuit (ASIC), a Field Programmable Gate Array (FPGA), or another programmable logic device, discrete gate or transistor logic device, or discrete hardware component. The processor may implement or perform methods, steps, and logical block diagrams disclosed in the embodiments of this application. The general-purpose processor may be a microprocessor, or the processor may be any conventional processor or the like. The steps of the methods disclosed with reference to the embodiments of this application may be directly performed and completed by using a hardware decoding processor, or may be performed and completed by using a combination of hardware and software modules in the decoding processor. The software module may be stored in a computer-readable storage medium that is mature in the art, such as a RAM, a flash memory, a ROM, a programmable ROM, an electrically erasable programmable memory, or a register. The computer-readable storage medium is located in the memory 702, and the processor 701 reads information in the memory 702, and completes the steps in the foregoing methods in combination with hardware thereof. In some embodiments, the computer-readable storage medium stores a computer program. The computer program, when being executed by the processor 701, implements, for example, the steps of the above embodiments of the positioning method.

It may be understood that, the embodiments described in the embodiments of this application may be implemented by using software, hardware, firmware, middleware, microcode, or a combination thereof. For hardware implementation, processing units may be implemented in one or more Application Specific Integrated Circuits (ASIC), a Digital Signal Processor (DSP), a DSP Device (DSPD), a Programmable Logic Device (PLD), a Field-Programmable Gate Array (FPGA), a general purpose processor, a controller, a micro-controller, a microprocessor, and other electronic units configured to execute the functions described in this application, or a combination of the above.

For implementation by software, the technologies in the embodiments of this application may be implemented by performing the functional modules (for example, a process and a function) in the embodiments of this application. Software code may be stored in a memory and executed by a processor. The memory may be implemented in the processor or outside the processor.

The terminal device 700 can implement various processes implemented by the terminal device in the foregoing embodiments. To avoid repetition, details are not described herein again.

For example, an embodiment of this application further provides a terminal device, including a processor, a memory, and a program or instruction stored on the memory and executable on the processor. The program or instruction, when executed by the processor, implements all processes of the embodiments of the above positioning method applied to the relay device or the Internet of Things device, and can achieve the same technical effects. To avoid repetition, details are not described herein again.

An embodiment of this application further provides a readable storage medium, storing a program or instruction. The program or instruction, when executed by a processor, implements all processes of the embodiments of the above positioning method applied to the relay device or the Internet of Things device, and can achieve the same technical effects. To avoid repetition, details are not described herein again.

The processor is the processor in the above network device in the foregoing embodiments. The readable storage medium includes a computer-readable storage medium, for example, a computer ROM, an RAM, a magnetic disk, or an optical disc.

Figure 8:
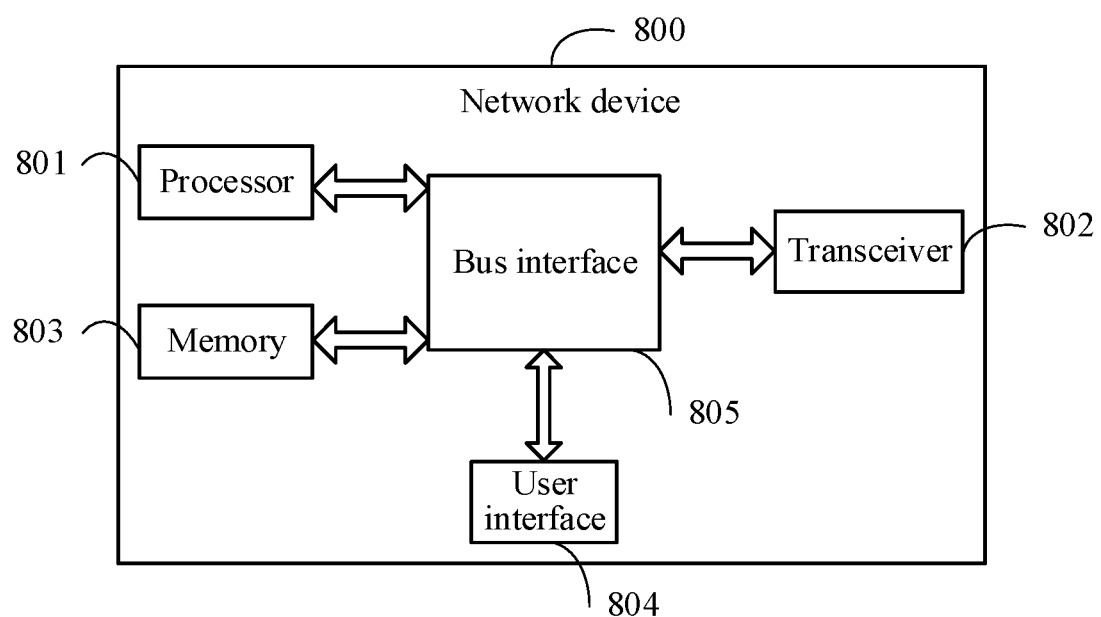
FIG. 8 is a schematic structural diagram of a second network device according to an embodiment of this application.

FIG. 8 is a structural diagram of a network device to which the embodiment of this application is applied, and can implement details of the above positioning method and achieve the same effects. As shown in FIG. 8, a network device 800 includes a processor 801, a transceiver 802, a memory 803, a user interface 804, and a bus system 805.

In this embodiment of this application, the network device 800 further includes: a program or instruction stored in the memory 803 and executable on the processor 801, the program or instruction, when executed by the processor 801, implementing the following step:

determining a to-be-positioned device, where the to-be-positioned device includes at least one of Internet of Things devices associated with a relay device.

In this embodiment of this application, in a scenario in which a relay device is associated with one or more Internet of Things devices, a to-be-positioned device that needs to be positioned may be determined by a network device, where the to-be-positioned device may include, but is not limited to, at least one of the Internet of Things devices associated with the relay device, the Internet of Things devices associated with the relay device may at least include: an Internet of Things device that the relay device has ever been associated with or an Internet of Things device that the relay device is being associated with, and device types may be the same or different. In this way, the positioning of the Internet of Things devices can be at least realized through a mobile communication network, and is more accurate and more secure.

In FIG. 8, a bus architecture may include any quantity of interconnected buses and bridges, and connects together circuits that are of one or more processors represented by the processor 801 and of a memory represented by the memory 803. The bus architecture may further connect various other circuits for example, a peripheral device, a voltage stabilizer, and a power management circuit. These are known in the art, and therefore are not further described in this specification. The bus interface 805 provides an interface. The transceiver 802 may be a plurality of components, including a transmitter and a receiver, and providing units for communicating with various other apparatuses on a transmission medium. For different user devices, the user interface 804 may be an interface capable of externally or internally connecting a required device, the connected device includes, but not limited to, a keypad, a display, a speaker, a microphone, and a joystick.

The processor 801 is responsible for the management of the bus architecture and normal processing, and the memory 803 may store data used when the processor 801 performs an operation.

For example, an embodiment of this application further provides a network device, including a processor, a memory, and a program or instruction stored on the memory and executable on the processor. The program or instruction, when executed by the processor, implements all processes of the embodiments of the above positioning method, and can achieve the same technical effects. To avoid repetition, details are not described herein again.

An embodiment of this application further provides a readable storage medium, storing a program or instruction. The program or instruction, when executed by a processor, implements all processes of the embodiments of the above positioning method applied to the network device, and can achieve the same technical effects. To avoid repetition, details are not described herein again.

The processor is the processor in the above network device in the foregoing embodiments. The readable storage medium includes a computer-readable storage medium, for example, a computer ROM, an RAM, a magnetic disk, or an optical disc.

It should be noted that, the term "include", "comprise" or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one . . . " does not exclude that there are still other same elements in the processes, methods, objects, or apparatuses. In addition, it should be noted that the scope of the methods and apparatuses in the implementations of this application is not limited to performing the functions in the order shown or discussed, but may also include performing, according to involved functions, the functions basically simultaneously or in a reverse order. For example, the described methods may be performed in an order different from that described, and various steps may also be added, omitted, or combined. In addition, features described with reference to some examples may be combined in other examples.

Through the descriptions of the foregoing implementations, a person skilled in the art may clearly understand that the method according to the foregoing embodiments may be implemented by means of software and a necessary general hardware platform, or may be implemented by hardware. In some embodiments, the technical solutions in this application essentially or the part contributing to the existing technologies may be implemented in the form of a software product. The computer software product is stored in a storage medium (for example, an ROM/RAM, a magnetic disk or an optical disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings. However, this application is not limited to the foregoing specific implementations. The foregoing specific implementations are illustrative instead of limitative. Enlightened by this application, a person of ordinary skill in the art can make many forms without departing from the idea of this application and the scope of protection of the claims. All of the forms fall within the protection of this application.

What is claimed is:

1. A positioning method, performed by a relay device, comprising:
  sending a capability interaction message to a first device, wherein the first device comprises: a first Internet of Things device that is associated with the relay device, or a network device, wherein when the first device is the network device, the capability interaction message sent to the network device comprises capability information of the relay device,
  wherein the capability information of the relay device comprises at least one of the following:
    whether the relay device supports establishing an association with the first Internet of Things device,
    whether the relay device supports positioning the first Internet of Things device,
    whether the relay device supports reporting location information of the first Internet of Things device,
    whether the relay device supports transmitting a positioning assistance message corresponding to the first Internet of Things device,
    whether the relay device supports capability interaction with the first Internet of Things device,
    whether the relay device supports being positioned by Internet of Things devices, or
    whether the relay device supports measuring a reference signal sent by the Internet of Things devices;
  determining a to-be-positioned device when the Internet of Things devices are associated, or positioning the to-be-positioned device, wherein the to-be-positioned device comprises the first Internet of Things device, and the first Internet of Things device is at least one of the Internet of Things devices associated with the relay device; and
  receiving location request information corresponding to the to-be-positioned device, or
  sending the location request information corresponding to the to-be-positioned device, wherein
  the location request information is used for determining the to-be-positioned device or positioning the to-be-positioned device position, and the location request information comprises
  at least one of the following:
  a type of the to-be-positioned device,
  a location request type of the to-be-positioned device, or
  identification information of the to-be-positioned device.

2. The positioning method according to claim 1, wherein the determining a to-be-positioned device, or positioning the to-be-positioned device comprises at least one of the following:
- determining the to-be-positioned device or positioning the to-be-positioned device according to a service request;
- determining the to-be-positioned device or positioning the to-be-positioned device according to a positioning assistance message; or
- determining the to-be-positioned device or positioning the to-be-positioned device according to the location request information.

3. The positioning method according to claim 2, further comprising at least one of the following:
- sending a first request to a network device, wherein the first request is used for obtaining the positioning assistance message; or
- receiving the positioning assistance message sent by the network device, wherein
  the positioning assistance message is used for determining the to-be-positioned device or positioning the to-be-positioned device.

4. The positioning method according to claim 2, wherein the positioning assistance message comprises at least one of the following:
- identification information of the to-be-positioned device; or
- first information for positioning the to-be-positioned device.

5. The positioning method according to claim 4, wherein the first information comprises at least one of the following:
- information of a reference signal measured by the first Internet of Things device;
- information of a reference signal sent by the first Internet of Things device;
- information required by the first Internet of Things device to perform Global Navigation Satellite System (GNSS) related positioning;
- information required by the first Internet of Things device to perform sensor positioning;
- a positioning method in which the relay device positions the first Internet of Things device;
- information of a reference signal sent by the relay device to the first Internet of Things device;
- information of a reference signal received by the relay device from the first Internet of Things device;
- information requested by the relay device from the first Internet of Things device; or
- location information and time information of the network device.

6. The positioning method according to claim 2, wherein the positioning assistance message comprises first indication information, and the first indication information is used for indicating at least one of the following:
- whether to send the positioning assistance message to the to-be-positioned device; or
- an association relationship between the positioning assistance message and the to-be-positioned device.

7. The positioning method according to claim 1, wherein the positioning the to-be-positioned device comprises:
- receiving location information sent by the to-be-positioned device.

8. The positioning method according to claim 7, wherein the location information comprises at least one of the following:
- location measurement information or location information of the to-be-positioned device; or
- relative location information of the to-be-positioned device.

9. The positioning method according to claim 1, further comprising at least one of the following:
- reporting location information obtained by positioning the to-be-positioned device; or
- reporting identification information of the to-be-positioned device.

10. The positioning method according to claim 1, further comprising:
- receiving the capability interaction message from the first device.

11. The positioning method according to claim 10, wherein the capability interaction message sent to the network device further comprises at least one of the following:
- identification information of the relay device;
- identification information of the first Internet of Things device; or
- capability information of the first Internet of Things device.

12. The positioning method according to claim 11, wherein the capability information of the first Internet of Things device comprises at least one of the following:
- whether the first Internet of Things device supports capability interaction with the relay device;
- whether the first Internet of Things device supports positioning assistance message and location information interaction with the relay device;
- a positioning method supported by the first Internet of Things device;
- a positioning manner supported by the first Internet of Things device;
- a reporting manner supported by the first Internet of Things device;
- a measurement capability supported by the Internet of Things device;
- a reporting capability supported by the Internet of Things device;
- a power control capability supported by the Internet of Things device;
- a space relativity capability supported by the Internet of Things device; or
- a signal processing capability supported by the Internet of Things device.

13. The positioning method according to claim 10, wherein the capability interaction message received from the first Internet of Things device or sent to the first Internet of Things device comprises at least one of the following:
- identification information of the first Internet of Things device; or
- capability information of the first Internet of Things device.

14. The positioning method according to claim 1, wherein the first Internet of Things device is in one of the following states: a connected state, an idle state, or an inactive state.

15. A terminal device, comprising: a memory having a computer program stored thereon; and a processor, wherein the computer program, when executed by the processor, causes the processor to perform a positioning method comprising:
- sending a capability interaction message to a first device, wherein the first device comprises: a first Internet of Things device that is associated with the terminal device, or a network device, wherein when the first device is the network device, the capability interaction message sent to the network device comprises capability information of the terminal device, wherein the capability information of the terminal device comprises at least one of the following:
  whether the terminal device supports establishing an association with the first Internet of Things device,
  whether the terminal device supports positioning the first Internet of Things device,
  whether the terminal device supports reporting location information of the first Internet of Things device,
  whether the terminal device supports transmitting a positioning assistance message corresponding to the first Internet of Things device,
  whether the terminal device supports capability interaction with the first Internet of Things device,
  whether the terminal device supports being positioned by Internet of Things devices, or
  whether the terminal device supports measuring a reference signal sent by the Internet of Things devices;
determining a to-be-positioned device when the Internet of Things devices are associated, or positioning the to-be-positioned device, wherein the to-be-positioned device comprises a first Internet of Things device, and the first Internet of Things device is at least one of the Internet of Things devices associated with the terminal device; and
receiving location request information corresponding to the to-be-positioned device, or
sending the location request information corresponding to the to-be-positioned device, wherein the location request information is used for determining the to-be-positioned device or positioning the to-be-positioned device position, and the location request information comprises at least one of the following:
  a type of the to-be-positioned device,
  a location request type of the to-be-positioned device, or
  identification information of the to-be-positioned device.

16. The terminal device according to claim 15, wherein the determining a to-be-positioned device, or positioning the to-be-positioned device comprises at least one of the following:
  determining the to-be-positioned device or positioning the to-be-positioned device according to a service request;
  determining the to-be-positioned device or positioning the to-be-positioned device according to a positioning assistance message; or
  determining the to-be-positioned device or positioning the to-be-positioned device according to the location request information.

17. The terminal device according to claim 16, wherein the method further comprises at least one of the following:
  sending a first request to a network device, wherein the first request is used for obtaining the positioning assistance message; or
  receiving the positioning assistance message sent by the network device, wherein the positioning assistance message is used for determining the to-be-positioned device or positioning the to-be-positioned device.

18. A network device, comprising: a memory having a computer program stored thereon; and a processor, wherein the computer program, when executed by the processor, causes the processor to perform a positioning method, comprising:
  receiving a capability interaction message comprising capability information of a relay device, wherein the capability information of the relay device comprises at least one of the following:
    whether the relay device supports establishing an association with a first Internet of Things device,
    whether the relay device supports positioning the first Internet of Things device,
    whether the relay device supports reporting location information of the first Internet of Things device,
    whether the relay device supports transmitting a positioning assistance message corresponding to the first Internet of Things device,
    whether the relay device supports capability interaction with the first Internet of Things device,
    whether the relay device supports being positioned by Internet of Things devices, or
    whether the relay device supports measuring a reference signal sent by the Internet of Things devices; and
  determining a to-be-positioned device, wherein the to-be-positioned device comprises at least one of the Internet of Things devices associated with the relay device, and
  receiving location request information corresponding to the to-be-positioned device, or
  sending the location request information corresponding to the to-be-positioned device, wherein the location request information is used for determining the to-be-positioned device, and the location request information comprises at least one of the following:
    a type of the to-be-positioned device,
    a location request type of the to-be-positioned device, or
    identification information of the to-be-positioned device.

* * * * *